(12) United States Patent
Ohkawa et al.

(10) Patent No.: US 6,593,409 B2
(45) Date of Patent: Jul. 15, 2003

(54) THERMOPLASTIC RESIN COMPOSITION AND INJECTION-MOLDED ARTICLE THEREOF

(75) Inventors: Kenichi Ohkawa, Ichihara (JP); Moriyasu Shimojo, Ichihara (JP); Shin-ichi Kondo, Bartlesville, OK (US)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/842,074

(22) Filed: Apr. 26, 2001

(65) Prior Publication Data

US 2002/0004546 A1 Jan. 10, 2002

(30) Foreign Application Priority Data

Apr. 28, 2000 (JP) ......................................... 2000-130336

(51) Int. Cl.$^7$ .................................................. C08K 3/30
(52) U.S. Cl. ........................................ 524/423; 524/451
(58) Field of Search .................................. 524/423, 451

(56) References Cited

U.S. PATENT DOCUMENTS

| | | | |
|---|---|---|---|
| 3,973,963 A | * 8/1976 | Venor | 96/3 |
| 5,026,752 A | * 6/1991 | Wakabayashi | 524/271 |
| 5,045,589 A | * 9/1991 | Ueno | 524/505 |
| 5,556,910 A | * 9/1996 | Harada | 524/504 |
| 5,563,194 A | * 10/1996 | Watanabe | 524/117 |
| 5,880,198 A | * 3/1999 | Kobayashi | 524/451 |
| 6,011,102 A | 1/2000 | Shimojo et al. | |
| 6,156,836 A | * 12/2000 | Iwanami | 524/451 |

FOREIGN PATENT DOCUMENTS

| | | |
|---|---|---|
| DE | 19821718 A1 | 11/1998 |
| EP | 0 784 074 A1 | 7/1997 |
| EP | 0 831 125 A1 | 3/1998 |
| EP | 0 872 517 A1 | 10/1998 |
| JP | 7286022 | 10/1995 |
| JP | 7286075 | 10/1995 |
| WO | WO0064972 | 11/2000 |

* cited by examiner

Primary Examiner—Edward J. Cain
(74) Attorney, Agent, or Firm—Birch, Stewart, Kolasch & Birch, LLP

(57) ABSTRACT

A thermoplastic resin composition comprising:

(A) polypropylene-based resin selected from the group consisting of a propylene homopolymer, an ethylene-propylene block copolymer composed of a propylene homopolymer portion and ethylene-propylene random copolymer portion having an intrinsic viscosity measured in tetralin at 135° C. of 1.0 or more and less than 8.0 dl/g and a mixture thereof, of 35 to 85 wt %;

(B) elastomer of 10 to 35 wt %;

(C) inorganic filler of 2 to 30 wt %; and (D) resin of 0.1 wt % or more and less than 5 wt %, wherein (1) the melt tension of (D) at 190° C. and a winding rate of 15.7 m/min. is 0.1 N or more, (2) the swelling ratio of (D) at 220° C., an L/D ratio of an orifice of 40 and a shear rate of $1.2 \times 10^3$ sec$^{-1}$ is 1.8 or more, and (3) the time required until the ratio (G(t)/G (0.02)) of the relaxation modulus G(t) at 210° C. to that G(0.02) in a time of 0.02 sec. reaches 0.01, of (D) is 10 sec. or more.

12 Claims, No Drawings

THERMOPLASTIC RESIN COMPOSITION AND INJECTION-MOLDED ARTICLE THEREOF

BACKGROUND OF THE INVENTION

1. Field of the Invention

The present invention relates to a thermoplastic resin composition excellent in rigidity and impact resistance, and provides, when molded, a molded article having a excellent appearance, particularly few flow marks. Further, the present invention relates to an injection-molded article of the thermoplastic resin composition.

2. Description of Related Arts

Polypropylene-based resins have been widely used in materials requiring rigidity, impact strength and the like. Recently, polypropylene-based resins are increasingly used, particularly, as automobile materials, and especially, ethylene-propylene block copolymers are used increasingly. Though ethylene-propylene block copolymers have been conventionally produced by a solvent method, the ethylene-propylene block copolymers are recently produced by a continuous gas phase method which is simple in a production process and can produce the ethylene-propylene block copolymer at low cost.

However, the ethylene-propylene block copolymer produced by the gas phase method has, in general, problems that, due to lower intrinsic viscosity $[\eta]_{EP}$ of an ethylene-propylene copolymer portion, swelling ratio (SR) is low, flow marks are many and appearance of a molded article deteriorates, further that when the intrinsic viscosity $[\eta]_{EP}$ of an ethylene-propylene copolymer portion of the ethylene-propylene block copolymer produced by a gas phase method is increased, a granular structure is generated and appearance of a molded article deteriorates.

For solving the problems regarding appearance as described above, for example, JP-A-07-286022 discloses a propylene-based block copolymer produced by a batch-wise solvent method, which has a intrinsic viscosity of an n-decane-insoluble component at 23° C. of 0.1 to 20 dl/g, has a intrinsic viscosity of an n-decane-soluble component at 23° C. of 5 to 15 dl/g, and can form a molded article without generating a gel on the appearance. However, as disclosed in Comparative Example 3 thereof, an ethylene-propylene block copolymer showing higher intrinsic viscosity of an n-decane-soluble component at 23° C. which is supposed to correspond to an ethylene-propylene block copolymer portion contains a lot of rubber granules causing gels.

Further, JP-A-07-286075 discloses a propylene polymer composition which contains a propylene polymer produced according to continuous mode and an ethylene-propylene block copolymer showing a intrinsic viscosity of an n-decane-soluble component at 23° C. of 5 to 12 dl/g, and can form a molded article generating no gels on appearance. However, the amount of the ethylene-propylene block copolymer compounded is as high as 12% by weight or more.

SUMMARY OF THE INVENTION

An object of the present invention is to provide a thermoplastic resin composition having an excellent stiffness, impact resistance and flowability, and providing, when molded, a molded article having a excellent appearance, particularly few flow marks, and an injection-molded article obtained by using the thermoplastic resin composition.

Under the situations, the present inventors have intensively studied, and resultantly found that the above-mentioned problems can be solved by a thermoplastic resin composition comprising a polypropylene-based resin, elastomer, inorganic filler, and an extremely small amount of a resin having specific melt tension (MT), specific swelling ratio (SR) and specific time required until the ratio of the relaxation modulus G(t) to the relaxation modulus G(0.02) in a time of 0.02 sec. reaches 0.01, and an injection-molded article obtained by using the resin composition, leading to completion of the present invention.

Namely, the present invention relates to a thermoplastic resin composition comprising:

(A) a polypropylene-based resin of 35 to 85% by weight;
(B) an elastomer of 10 to 35% by weight;
(C) an inorganic filler of 2 to 30% by weight; and
(D) a resin of 0.1% by weight or more and less than 5% by weight, wherein (1) the melt tension of the resin (D) measured at a temperature of 190° C. and a winding rate of 15.7 m/min. is 0.1 N or more, (2) the swelling ratio of the resin (D) measured at a temperature of 220° C., an L/D ratio of an orifice of 40 and a shear rate of $1.2 \times 10^3$ sec$^{-1}$ is 1.8 or more, and (3) the time required until the ratio (G(t)/G(0.02)) of the relaxation elastic modulus G(t) measured at 210° C. to there laxation elastic modulus G(0.02) in a time of 0.02 sec. reaches 0.01, of the resin (D) is 10 sec. or more, and wherein the sum of the (A), (B), (C) and (D) is 100% by weight.

Further, the present invention relates to an injection-molded article obtained by using the above-mentioned thermoplastic resin composition.

The present invention will be illustrated in detail below.

DETAILED DESCRIPTION OF THE INVENTION

The propylene-based resin (A) used in the present invention is not particularly restricted, and preferably, is a crystalline polypropylene-based resin, and examples thereof include a crystalline propylene homopolymer, crystalline ethylene-propylene copolymer, crystalline propylene-α-olefin copolymer and the like, and these may be used alone or in a combination of two or more.

The α-olefin used in the crystalline propylene-α-olefin copolymer is an α-olefin having 4 or more carbon atoms, preferably 4 to 20 carbon atoms, more preferably 4 to 12 carbon atoms, and examples thereof include butene-1, pentene-1, hexene-1, heptene-1, octene-1, decene-1 and the like. Examples of the crystalline propylene-α-olefin copolymer include a crystalline propylene-butene-1 copolymer, crystalline propylene-hexene-1 copolymer and the like.

Further, the crystalline polypropylene-based resin is preferably a crystalline propylene homopolymer, a crystalline ethylene-propylene block copolymer or a mixture of thereof, more preferably a crystalline ethylene-propylene block copolymer or a mixture of a crystalline propylene homopolymer and a crystalline ethylene-propylene block copolymer.

The crystalline ethylene-propylene block copolymer used in the present invention is a crystalline ethylene-propylene block copolymer composed of a propylene homopolymer portion (referred to as "first segment") and an ethylene-propylene random copolymer portion (referred to as "second segment").

The propylene homopolymer portion as the first segment has a Q value which is a ratio of weight average molecular weight (Mw)/number average molecular weight (Mn) according to a gel permeation chromatography (GPC) method of preferably from 3.0 to 5.0, more preferably from 3.5 to 4.5. The first segment has preferably an isotactic pentad fraction calculated based on $^{13}$C-NMR of preferably 0.98 or more, more preferably 0.99 or more. Further, the intrinsic viscosity $[\eta]_P$ of a tetralin solution at 135° C. of the first segment is preferably from 0.7 to 1.1 dl/g, more preferably from 0.8 to 1.0 dl/g.

The ethylene-propylene random copolymer portion as the second segment, has an intrinsic viscosity $[\eta]_{EP}$ of a tetralin solution at 135° C. of from 1.0 or more and less than 8.0 dl/g, preferably from 1.5 to 7.5 dl/g. Further, the second segment has an ethylene content $[(C2')_{EP}]$ of preferably from 25 to 35% by weight, more preferably from 27 to 33% by weight.

The weight ratio of the ethylene-propylene random copolymer portion (second segment) to the propylene homopolymer portion (first segment) (second segment/first segment ratio) is preferably 8/92 to 35/65.

The crystalline propylene homopolymer used in the above-mentioned mixture with the crystalline ethylene-propylene block copolymer is a polymer having physical properties similar to those of the propylene homopolymer portion which is the first segment of the crystalline ethylene-propylene block copolymer, and specifically having a Q value which is ratio of weight-average molecular weight (Mw) to number-average molecular weight (Mn) according to a gel permeation chromatography (GPC) method of preferably from 3.0 to 5.0, more preferably from 3.5 to 4.5. This crystalline homopolymer has an isotactic pentad fraction calculated based on $^{13}$C-NMR of preferably 0.98 or more, more preferably 0.99 or more. Further, this crystalline homopolymer shows a intrinsic viscosity $[\eta]_P$ of a tetralin solution at 135° C. of preferably from 0.7 to 1.1 dl/g, more preferably from 0.8 to 1.0 dl/g.

A method for producing the polypropylene-based resin used in the present invention is not particularly restricted, and the polypropylene-based resin can be produced, for example, by a know n polymerization method such as a bulk polymerization method, solution polymerization method, slurry polymerization method or gas phase polymerization method, or any combination of these polymerization methods, using a known stereoregular olefin polymerization catalyst such as a Ziegler-Natta catalyst system, a metallocene catalyst system or a combination thereof, and a continuous gas phase polymerization method is preferable.

Particularly, the crystalline ethylene-propylene block copolymer is preferably that which is produced by homopolymerizing propylene in the presence of a stereoregular olefin polymerization catalyst in the first step to obtain a crystalline propylene homopolymer portion as a first segment, and subsequently copolymerizing ethylene and propylene in the second step to obtain an ethylene-propylene random copolymer portion as a second segment.

The compounding proportion of the polypropylene-based resin (A) is from 35 to 85% by weight, preferably from 40 to 80% by weight, more preferably from 45 to 75% by weight based on the sum (100% by weight) of the (A), (B), (C) and (D) components.

When the compounding proportion of the polypropylene-based resin (A) is less than 35% by weight, the rigidity may decrease, while when over 85% by weight, the impact resistance may decrease.

The elastomer (B) used in the present invention is not particularly restricted, and preferably is one containing a rubber component. For example, an elastomer composed of vinyl aromatic compound-containing rubber and/or ethylene-α-olefin random copolymer rubber, and the like are listed.

As the vinyl aromatic compound-containing rubber used in the present invention, block copolymers consisting of a vinyl aromatic compound polymer block and a conjugated diene-based polymer block, and the like are exemplified, and preferable are those in which suitably 80% or more, more suitably 85 or more of double bonds of the conjugated diene portion is hydrogenated. This rubber has Q value (a molecular weight distribution) according to a GPC method of preferably 2.5 or less, more preferably 2.3 or less. The average content of a vinyl aromatic compound in the vinyl aromatic compound-containing rubber is preferably from 10 to 20% by weight, more preferably from 12 to 19% by weight. Further, the melt flow rate (MFR, JIS-K-6758, 230° C.) of the vinyl aromatic compound-containing rubber is preferably from 1 to 15 g/10 min., more preferably from 2 to 13 g/10 min.

Examples of the above-mentioned vinyl aromatic compound-containing rubber or the hydrogenated product thereof include block copolymers such as styrene-ethylene-butene-styrene-based rubber (SEBS), styrene-ethylene-propylene-styrene-based rubber (SEPS), styrene-butadiene-based rubber (SBR), styrene-butadiene-styrene-based rubber (SBS), styrene-isoprene-styrene-based rubber (SIS), and the like. A rubber obtained by reacting a vinyl aromatic compound such as styrene or the like with an olefin-based copolymer rubber such as an ethylene-propylene-non-conjugated diene-based rubber (EPDM) can also be used suitably. Further, two or more of vinyl aromatic compound-containing rubber may also be used together.

The production method of the above-mentioned vinyl aromatic compound-containing rubber is not particularly restricted, and there are listed, for example, a method in which a vinyl aromatic compound is bonded, by polymerization, reaction or the like, to an olefin-based copolymer rubber or conjugated diene rubber, and the like.

In the ethylene-α-olefin random copolymer rubber used in the present invention, the α-olefin is an α-olefin having 3 or more carbon atoms, preferably 3 to 20 carbon atoms, more preferably 3 to 12 carbon atoms such as, for example, propylene, butene-1, pentene-1, hexene-1, heptene-1, octene-1, decene-1 and the like, and preferably propylene, butene-1, hexene-1 and octene-1.

Examples of the ethylene-α-olefin random copolymer rubber include an ethylene-propylene random copolymer rubber, ethylene-butene-1 random copolymer rubber, ethylene-hexene-1 random copolymer rubber, ethylene-octene-1 random copolymer rubber and the like, and preferably an ethylene-octene-1 random copolymer rubber, ethylene-butene-1 random copolymer rubber and ethylene-propylene random copolymer rubber. Further, the ethylene-α-olefin random copolymer rubbers may be used alone or in combination of two or more thereof.

The ethylene-octene-1 random copolymer rubber has a Q value (molecular weight distribution) according to a GPC method of preferably 2.5 or less, more preferably 2.3 or less. Further, the ethylene-octene-1 random copolymer rubber has an octene-1 content of preferably from 15 to 45% by weight, more preferably from 18 to 42% by weight. Furthermore, the ethylene-octene-1 random copolymer rubber has a melt flow rate (MFR, JIS-K-6758, 190° C.) of preferably from 1 to 15 g/10 min., more preferably from 2 to 13 g/10 min.

The ethylene-butene-1 random copolymer rubber has a Q value according to a GPC method of preferably 2.7 or less, more preferably 2.5 or less. Further, the ethylene-butene-1 random copolymer rubber has a butene-1 content of preferably from 15 to 35% by weight, further preferably from 17 to 33% by weight. Furthermore, the ethylene-butene-1 random copolymer rubber has a melt flow rate (MFR, JIS-K-6758, 190° C.) of preferably from 1 to 15 g/10 min., more preferably from 2 to 13 g/1 min.

The ethylene-propylene random copolymer rubber has a molecular weight distribution (Q value) according to a GPC=method of preferably 2.7 or less, more preferably 2.5 or less. Further, the ethylene-propylene random copolymer rubber has a propylene content of preferably from 20 to 30% by weight, further preferably from 22 to 28% by weight. Furthermore, the ethylene-propylene random copolymer rubber has a melt flow rate (MFR, JIS-K-6758, 190° C.) of preferably from 1 to 15 g/10 min., more preferably from 2 to 13 g/10 min.

The production method of the above-mentioned ethylene-α-olefin random copolymer rubber is not particularly restricted, and the random copolymer rubber can be produced by copolymerizing ethylene with an α-olefins by a known polymerization method, using a known catalyst. As the known catalyst, for example, a catalyst system consisting of a vanadium compound and an organic aluminum compound, a Ziegler-Natta catalyst system or a metallocene catalyst system, and the like are listed, and as the known polymerization method, a solution polymerization method, slurry polymerization method, high pressure ion polymerization method or gas phase polymerization method, and the like are exemplified.

The compounding proportion of the elastomer (B) is from 10 to 35% by weight, preferably from 15 to 30% by weight. When the content of the elastomer (B) is less than 10% by weight, impact strength of the thermoplastic composition may decrease, while when over 35% by weight, the rigidity and heat resistance may decrease.

The inorganic filler (C) is not particularly restricted so far as the rigidity is improved. For example, calcium carbonate, barium sulfate, mica, crystalline calcium silicate, talc, magnesium sulfate fiber and the like are listed. Preferable are talc and/or magnesium sulfate fiber.

Talc used in the present invention is not particularly restricted, and preferable is one obtained by grinding water-containing magnesium silicate. The crystalline structure of molecules shows a pyrophyllite type three-layered structure and the talc includes lamination of this structure, and particularly, a plate-like powder in which the crystal is finely pulverized to about unit layer is preferable.

Talc used in the present invention has an average particle size of preferably 3 $\mu$m or less. The average particle size of talc means a 50% equivalent particle size $D_{50}$ determined from an integrated distribution curve by a minus sieve method made by suspending the talc in a dispersing medium such as water and alcohol and measuring the particle sizes using a centrifugal sedimentation type particle size distribution measuring apparatus.

Talc may be used itself without treatment, or may be surface-treated with known various silane coupling agents, titanium coupling agents, higher fatty acids, higher fatty esters, higher fatty amides, higher fatty salts or other surfactants before use for the purpose of improving interfacial adhesion with the polypropylene-based resin (A) and dispersability.

The magnesium sulfate fiber is not particularly restricted, and has an average fiber length of preferably from 5 to 50 $\mu$m, more preferably from 10 to 30 $\mu$m. The magnesium sulfate fiber has an average fiber diameter of preferably from 0.3 to 2.0 $\mu$m, more preferably from 0.5 to 1.0 $\mu$m.

The compounding proportion of the inorganic filler (C) used in the present invention is from 2 to 30% by weight, preferably from 5 to 30% by weight, more preferably from 10 to 30% by weight. When the proportion of the inorganic filler is less than 2% by weight, the rigidity may decrease, while when over 30% by weight, impact strength may be insufficient, and further, appearance may also deteriorate.

The resin (D) used in the present invention is a resin which can improve the swelling ratio (SR) of a polypropylene-based resin composition, and has a melt tension (MT) measured at a temperature of 190° C. and a winding rate of 15.7 m/min. of 0.1 N or more, preferably 0.15 N or more. When this melt tension (MT) is less than 0.1 N, appearance of a molded article may be insufficient.

The resin (D) has a swelling ratio (SR) measured at a temperature of 220° C., an L/D ratio of an orifice of 40 and a shearing rate of $1.2\times10^3$ sec$^{-1}$ of 1.8 or more, preferably 2.0 or more. When this swelling ratio (SR) is less than 2.0, appearance of a molded article may be insufficient.

The time required until the ratio (G(t)/G(0.02)) of the relaxation modulus G(t) of the resin (D) measured at 210° C. to the relaxation modulus G(0.02) in a time of 0.02 sec. thereof measured at 210° C. reaches 0.01 is 10 sec. or more, preferably 15 sec. or more. When the time required until the ratio (G(t)/G(0.02)) of the relaxation modulus G(t) measured at 210° C. to the relaxation modulus G(0.02) in a time of 0.02 sec. reaches 0.01 is less than 10 sec., appearance of a molded article may be insufficient.

As the resin (D) used in the present invention, for example, a polypropylene block copolymer and/or a polypropylene master batch of polytetrafluoroethylene fiber and the like are listed.

The polypropylene block copolymer is preferably an ethylene-propylene block copolymer, further preferably an ethylene-propylene block copolymer composed of propylene homopolymer portion and an ethylene-propylene copolymer portion, having a intrinsic viscosity $[\eta]_{EP}$ of the ethylene-propylene copolymer portion of from 8 to 15 dl/g and a content of the ethylene-propylene copolymer portion of from 20 to 40% by weight.

The amount of the resin (D) used in the present invention is 0.1% by weight or more and less than 5% by weight, preferably from 0.5 to 4.5% by weight, further preferably from 1.0 to 4.5% by weight based on the sum of the components (A), (B), (C) and (D). When the amount of the resin (D) is less than 0.1% by weight, appearance of a molded article may be insufficient, while when 5% by weight or more, the flowability of the thermoplastic plastic composition may decrease.

The thermoplastic resin composition of the present invention can be produced using a kneader such as a single-screw extruder, twin-screw extruder, Banbury mixer, heat roll or the like. Addition and mixing of components into a kneader can be conducted simultaneously or divisionally, and for example, the following methods are listed, but it is not limited thereto.

(Method 1)

A method in which a polypropylene-based resin (A) and an inorganic filler (C) are kneaded, an elastomer (B) is added to the mixture, and then, a resin (D) is kneaded with the resulting mixture.

(Method 2)

A method in which an inorganic filler (C) is previously kneaded in high concentration with a polypropylene-based resin (A) to obtain a master batch, the master batch is diluted with a polypropylene-based resin (A), an elastomer (B) or the like, and then, a resin (D) is kneaded with the resulting mixture.

(Method 3)

A method in which a polypropylene-based resin (A) and elastomer (B) are kneaded, an inorganic filler (C) is added to the mixture, and then, a resin (D) is kneaded with the resulting mixture.

(Method 4)

A method in which an elastomer (B) is previously kneaded in high concentration with a polypropylene-based resin (A) to obtain a master batch, a polypropylene-based resin (A) and an inorganic filler (C) are added to the master batch, and then, a resin (D) is kneaded with the mixture.

(Method 5)

A method in which a polypropylene-based resin (A) and an inorganic filler (C), and a polypropylenee-based resin (A) and elastomer (B) are previously kneaded, respectively, thereafter, they are combined, and then, a resin (D) is kneaded with the resulting mixture.

The kneading temperature is usually from 170 to 250° C., more preferably from 190 to 230° C. The kneading time is usually from 1 to 20 minutes, more preferably from 3 to 15 minutes.

Further, in these kneaders, additives such as an antioxidant, ultraviolet absorber, lubricant, pigment, antistatic agent, copper inhibitor, flame retardant, neutralizing agent, foaming agent, plasticizer, nucleating agent, foam inhibitor, cross-linking agent and the like may also be appropriately compounded in the range wherein the object and effect of the present invention are not lost, in addition to the components (A), (B), (C) and (D) used in the present invention.

The thermoplastic resin composition of the present invention can be generally molded into an injection-molded article by a known injection molding. Particularly, the injection-molded article is suitably used as parts for automobiles such as a door trim, pillar, instrumental panel, bumper and the like.

EXAMPLE

The present invention will be explained by the following examples, but is not thereto.

Methods for measuring physical properties of resin components and compositions used in examples and comparative examples are shown below.

(1) Melt Flow Rate (MFR, Unit: g/10 min.)

It was measured according to a method defined in JIS-K-6758. Unless other wise stated, it was measured at a temperature of 230° C. and a load of 2.16 kg.

(2) Flexural Modulus (FM, Unit: kg/cm$^2$)

It was measured according to a method defined in JIS-K-7203. It was measured using a specimen having a thickness of 6.4 mm and a span length of 100 mm prepared by injection molding under a load rate of 2.0 or 30 mm/min. at a measuring temperature of 23° C.

(3) Izod Impact Strength (Izod, Unit: kg·cm/cm$^2$)

It was measured according to a method defined in JIS-K-7110. It was measured using a specimen having a thickness of 6.4 mm prepared by injection molding and having a notch formed by notch processing after the molding, at measuring temperatures of 23° C. and −30° C.

(4) Heat Distortion Temperature (HDT, Unit: ° C.)

It was measured according to a method defined in JIS-K-7207. And, it was measured at a fiber stress of 18.6 kg/cm$^2$ or 4.6 kg/cm$^2$.

(5) Rockwell Hardness (HR)

It was measured according to a method defined in JIS-K-7202. It was measured using a specimen having a thickness of 3.0 mm prepared by injection molding. The measured value is shown by R scale.

(6) Brittle Temperature (BP, Unit: CC)

It was measured according to a method defined in JIS-K-7216. A given specimen of 6.3×38×2 mm was punched out from a flat plate of 25×150×2 mm molded by injection molding, and the measurement was conducted on this specimen.

(7) Intrinsic Viscosity (Unit: dl/g)

Reduced viscosities were measured at three points of concentrations of 0.1, 2 and 0.5 g/dl using a Ubbellohde type viscometer. The intrinsic viscosity was calculated by a calculation method described on page 491 in "Kobunshi Yoeki (Polymer Solution), Kobunshi Jikkengaku (Polymer Experiment Study) 11" (published by Kyoritsu Shuppan K.K., 1982), namely, by an extrapolation method in which reduced viscosities are plotted against concentrations and the concentration is extrapolated in zero.

Regarding a crystalline polypropylene, the intrinsic viscosity was measured at a temperature of 135° C. using tetralin as a solvent.

(7-1) Intrinsic Viscosity of Crystalline Ethylene-Propylene Block Copolymer (7-1a) Intrinsic Viscosity of Propylene Homopolymer Portion (First Segment): $[\eta]_P$ A propylene homopolymer portion as a first segment of a crystalline ethylene-propylene block copolymer was sampled from a polymerization reactor after the first step and the intrinsic viscosity $[\eta]_P$ of the propylene homopolymer portion was measured.

(7-1b) Intrinsic Viscosity of Ethylene-Propylene Random Copolymer Portion (Second Segment): $[\eta]_{EP}$ The intrinsic viscosity $[\eta]_{EP}$ of an ethylene-propylene random copolymer portion which is a second segment of a crystalline ethylene-propylene block copolymer was determined by measuring the intrinsic viscosity of a propylene homo-polymer $[\eta]_P$ and the intrinsic viscosity of the total ethylene-propylene block copolymer $[\eta]_T$ respectively, and effecting calculation according to the following equation using weight ratio: X of the ethylene-propylene random copolymer portion to the total crystalline ethylene-propylene block copolymer.

$$[\eta]_{EP}=[\eta]_T/X-(1/X-1)[\eta]_P$$

$[\eta]_P$: intrinsic viscosity of propylene homopolymer portion (dl/g)

$[\eta]_T$: intrinsic viscosity of total block copolymer (dl/g)

(7-1c) Weight ratio of ethylene-propylene random copolymer portion to total crystalline ethylene-propylene block copolymer: X The ratio by weight: X of an ethylene-propylene random copolymer portion to the total crystalline ethylene-propylene block copolymer was obtained by measuring the crystal fusion heats of a propylene homo-polymer portion (first segment) and the total crystalline ethylene-propylene block copolymer, respectively, and effecting calculation using the following equation. The crystal fusion heat was measured by a differential scanning calorimetry (DSC).

$$X=1-(\Delta H_f)_T/(\Delta H_f)_P$$

$(\Delta H_f)_T$: Fusion heat of total block copolymer (cal/g)

$(\Delta H_f)_P$: Fusion heat of propylene homo-polymer portion (cal/g)

(8) Ethylene Content of Ethylene-Propylene Random Copolymer Portion in Crystalline Ethylene-Propylene Block Copolymer: $(C_2')_{EP}$ The ethylene content: $(C_2')_{EP}$ of an ethylene-propylene random copolymer portion in a crystalline ethylene-propylene block copolymer was determined by measuring the ethylene content $(C_2')_T$ (wt %) of the total crystalline ethylene-propylene block copolymer by an infrared absorption spectrometry, and effecting calculation using the following equation.

$$(C_2')_{EP} = (C_2')_T / X$$

$(C_2')_T$: Ethylene content (wt %) of total block copolymer $(C_2')_{EP}$: Ethylene content (wt %) of ethylene-propylene random copolymer portion X: Weight ratio of ethylene-propylene random copolymer portion to total crystalline ethylene-propylene block copolymer (9) Isotactic Pentad Fraction The isotactic pentad fraction is a fraction of propylene monomer units existing at the center of an isotactic chain in the form of a pentad unit, in other words, the chain in which five propylene monomer units are successively meso-bonded, in the polypropylene molecular chain as measured by a method disclosed in A. Zambelli et al., Macromolecules, 6, 925 (1973), namely, by use of $^{13}$C-NMR. However, the assignment of NMR absorption peaks was conducted based on Macromolecules, 8, 687 (1975) published thereafter.

Specifically, the isotactic pentad fraction was measured as an area fraction of mmmm peaks in all absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to find it was 0.944.

(10) Molecular Distribution (Q Value)

It was determined by measuring with a gel permeation chromatograph (GPC) under the following conditions.

GPC: 150° C. type, manufactured by Waters

Column: Shodex 80 MA, two articles, manufactured by Showa Denko K.K.

Amount of sample: 300 µl (polymer concentration: 0.2 wt %)

Flow rate: 1 ml/min.

Temperature: 135° C.

Solvent: o-dichlorobenzene

A calibration curve of eluted volume vs. molecular weight was prepared using standard polystyrene manufactured by Tohso Corporation. The polystyrene-reduced weigh average molecular weight and number average molecular weight were calculated using the calibration curve, and the Q value, scale of molecular weight distribution was calculated according to weigh average molecular weight/number average molecular weight.

(11) Melt Tension (MT, Unit: N)

It was measured according to the following conditions, using Melt Tension Tester RE2 manufactured by Toyo Seiki Seisakusho K.K.

Measuring temperature: 190° C.

Winding rate: 15.7 mm/min.

(12) Swelling Ratio (SR)

It was measured according to the following conditions, using Capillograph 1B manufactured by Toyo Seiki Seisakusho K.K.

Measuring temperature: 220° C.

L/D: 40

Shear rate: $1.2 \times 10^3$ sec$^{-1}$ (0056)

(13) Time Until Ratio of Relaxation Elastic Modulus G(t) to Relaxation Elastic Modulus G(0.2) in Time of 0.02 Sec. Reaches 0.01

It was measured according to the following conditions, using Mechanical Spectrometer RMS-800 manufactured by Rheometrics Co., Ltd.

Measuring mode: Stress Relaxation

Measuring temperature: 210° C.

Plate form: 25 mmφ parallel plate

Plate distance: 1.9 mm

Strained amount: 0.2

Applied strain: 0.2

(14) Appearance

The appearance of a specimen prepared by injection molding was observed visually, and good or no good was judged.

(Production of Injection Molded Article)

Specimens which are injection-molded articles for evaluating physical properties in the above-mentioned (2), (3), (4), (5), (6) and (14) were manufactured according to the following method. A composition was dried by a hot air drier at 120° C. for 2 hours, then, injection-molded using an injection molding machine, IS150E-V type, manufactured by Toshiba Machine Co., Ltd. at a molding temperature of 220° C., a mold cooling temperature of 50° C., an injection time of 15 sec. and a cooling time of 30 sec., to obtain a specimen.

(Production of Thermoplastic Resin Composition)

A thermoplastic resin composition was produced according to the following method. Components were respectively weighed in a predetermined amount, preliminarily mixed homogenously in a Henschel mixer or tumbler mixer, then, kneaded and extruded by using a twin-screw kneading extruder (TEX44SS 30BW-2V type, manufactured by The Japan Steel Works, Ltd.) at an extrusion rate of 30 to 50 kg/hr and a screw revolution of 350 rpm under vent suction, to produce a composition. The screw was constructed by arranging a triple thread type rotor and a kneading disc in two kneading zones which are the zone subsequent to the first feed inlet and the zone subsequent to the second feed inlet, respectively.

The physical properties of the polypropylene-based resins (A) used in Examples 1 to 4 and Comparative Examples 1 to 4 are shown in Table 1, and the physical properties of the elastomer (B) used in Examples 1 to 4 and Comparative Examples 1 to 4 are shown in Table 2.

The contents (% by weight) of components in the thermoplastic resin compositions in Examples 1 to 4 are shown in Table 3, and those of the components in the thermoplastic resin compositions in Comparative Examples 1 to 4 and Comparative Examples 5 and 6 are shown in Tables 4 and 7, respectively.

The physical properties of the thermoplastic resin compositions in Examples 1 to 4 and the physical properties and appearances of injection-molded articles obtained by using the compositions are shown in Table 5, and the physical properties of the thermoplastic resin compositions in Comparative Examples 1 to 4 and Comparative Examples 5 and 6, and the physical properties and appearances of injection-molded articles obtained by using the compositions are shown in Table 6 and 8, respectively.

In Examples 1 and 2 and Comparative Examples 1 and 2, talc was used as an inorganic filler, and in Examples 3 and 4 and Comparative Examples 3 and 4, talc and a magnesium sulfate fiber were used.

The resin (D) used in Examples 1 to 4 and Comparative Example 5 were an ethylene-propylene block copolymer in which the melt tension (MT) measured at a temperature of 190° C. and a winding rate of 15.7 m/min. was 0.2 g, the swelling ratio (SR) measured at a temperature of 220° C., an L/D ratio of an orifice of 40 and a shear rate of $1.2 \times 10^3$ sec$^{-1}$ was 2.34, and the time required until the ratio ($G(t)/G(0.02)$) of the relaxation modulus $G(t)$ measured at 210° C. to the relaxation modulus $G(0.02)$ in a time of 0.02 sec. reaches 0.01 was 36 sec.

The propylene homopolymer portion of the ethylene-propylene block copolymer had a molecular weight distribution (Q value) of 4.0, a intrinsic viscosity $[\eta]_P$ of 0.91 dl/g and an isotactic pentad fraction of 0.99, and the ethylene-propylene random copolymer portion of the ethylene-propylene block copolymer had an intrinsic viscosity $[\eta]_{EP}$ of 11.5 dl/g, the content of the ethylene-propylene random copolymer portion in the ethylene-propylene block copolymer was 25.1% by weight, and the ethylene content of the ethylene-propylene random copolymer portion was 23.1% by weight.

TABLE 1

Polypropylene resin (A)

| | | P portion | | EP portion | |
| | | | | Content 1 | Content 2 |
| Sample | Q | $[\eta]_P$ (dl/g) | mmmm | $[\eta]_{EP}$ (dl/g) | (% by weight) | (% by weight) |
| --- | --- | --- | --- | --- | --- | --- |
| BC-1 | 3.5 | 1.00 | 0.97 | 2.1 | 18.0 | 40.0 |
| BC-2 | 3.5 | 1.30 | 0.97 | 2.5 | 14.5 | 40.0 |
| PP-1 | 4.0 | 0.77 | 0.99 | — | — | — |
| PP-2 | 4.0 | 0.89 | 0.99 | — | — | — |
| PP-3 | 4.0 | 0.94 | 0.99 | — | — | — |
| PP-4 | 4.0 | 1.72 | 0.99 | — | — | — |

BC: Ethylene-propylene block copolymer
PP: Propylene homopolymer
P portion: propylene homopolymer portion of ethylene-propylene block copolymer, or whole propylene homopolymer
EP portion: Ethylene-propylene random copolymer portion of ethylene-propylene block copolymer
Content 1: Content of ethylene-propylene random copolymer portion in ethylene-propylene block copolymer
Content 2: Content of ethylene in ethylene-propylene random copolymer portion
mmmm: Isotactic pentad fraction

TABLE 2

Elastomer (B)

| | MFR | | | |
| | Measuring temperature 190° C. (g/10 min.) | Measuring temperature 230° C. (g/10 min.) | Comonomer Content | Styrene content |
| Sample | | | | |
| --- | --- | --- | --- | --- |
| SEBS-1 | — | 6 | — | 18 |
| EBR-1 | 2 | — | 32 | — |
| EOR-1 | 2 | — | 40 | — |

SEBS-1: Vinyl aromatic compound containing rubber
EBR-1: Ethylene-butene-1 copolymer rubber
EOR-1: Ethylene-octene-1 copolymer rubber

TABLE 3

| | | Example 1 | Example 2 | Example 3 | Example 4 |
| --- | --- | --- | --- | --- | --- |
| Composition (% by weight) | BC-1 | — | 19 | — | — |
| | BC-2 | — | — | — | 23.9 |
| | PP-1 | 49.1 | 33.5 | — | — |
| | PP-2 | — | — | — | — |
| | PP-3 | — | — | 33 | 24 |
| | PP-4 | — | — | 14.5 | 3 |
| | SEBS-1 | 9.3 | 8.1 | — | — |
| | EBR-1 | 9.1 | 8 | — | — |
| | EOR-1 | 8.5 | 7.4 | 22.5 | 19.1 |
| | Talc | 21 | 21 | 22 | 22 |
| | Magnesium sulfate fiber | — | — | 4 | 4 |
| | Resin (D) | 3 | 3 | 4 | 4 |

TABLE 4

| | | Comparative Example 1 | Comparative Example 2 | Comparative Example 3 | Comparative Example 4 |
| --- | --- | --- | --- | --- | --- |
| Composition (% by weight) | BC-1 | — | 23 | — | — |
| | BC-2 | — | — | — | 30.3 |
| | PP-1 | 35.1 | 27.5 | — | — |
| | PP-2 | 17 | 5 | 30.6 | 21.6 |
| | PP-3 | — | — | — | — |
| | PP-4 | — | — | 20 | 3 |
| | SEBS-1 | 9.3 | 8.1 | — | — |
| | EBR-1 | 9.1 | 8 | — | — |
| | EOR-1 | 8.5 | 7.4 | 23.4 | 19.1 |
| | Talc | 21 | 21 | 22 | 22 |
| | Magnesium sulfate fiber | — | — | 4 | 4 |
| | Resin (D) | — | — | — | — |

TABLE 5

| | Example 1 | Example 2 | Example 3 | Example 4 |
| --- | --- | --- | --- | --- |
| MFR (g/10 min.) | 54 | 39 | 17 | 17 |
| FM (kg/cm$^2$) | 21100 | 19700 | 28400 | 26600 |
| Izod 23° C. (Kg. cm/cm$^2$) | 38 | 58 | 46 | 49 |
| −30° C. | 5.2 | 6.2 | 3.7 | 3.7 |
| HDT 4.6 kg/cm$^2$ (° C.) | — | — | 146 | 143 |
| 18.6 kg/cm$^2$ | 70 | 69 | — | — |
| HR | 73 | 71 | 77 | 72 |
| BP (° C.) | −28 | −28 | — | — |
| Appearance | Good | Good | Good | Good |

TABLE 6

|  | Comparative Example 1 | Comparative Example 2 | Comparative Example 3 | Comparative Example 4 |
|---|---|---|---|---|
| MFR (g/10 min.) | 51 | 39 | 17 | 19 |
| FM (kg/cm²) | 21200 | 18800 | 28900 | 26400 |
| Izod 23° C. (Kg. cm/cm²) | 27 | 52 | 44 | 49 |
| −30° C. | 4.9 | 6.3 | 3.6 | 3.3 |
| HDT 4.6 kg/cm² (° C.) | — | — | 145 | 142 |
| 18.6 kg/cm² | 71 | 66 | — | — |
| HR | 75 | 68 | 83 | 77 |
| BP (° C.) | −30 | −35 | — | — |
| Appearance | Bad | Bad | Bad | Bad |

TABLE 7

|  |  | Comparative Example 5 | Comparative Example 6 |
|---|---|---|---|
| Composition (% by weight) | BC-1 | 12 | 19 |
|  | BC-2 | — | — |
|  | PP-1 | 33.5 | 33.5 |
|  | PP-2 | — | — |
|  | PP-3 | — | — |
|  | PP-4 | — | — |
|  | SEBS-1 | 8.1 | 8.1 |
|  | EBR-1 | 8 | 8 |
|  | EOR-1 | 7.4 | 7.4 |
|  | Talc | 21 | 21 |
|  | Resin (D) | 10 | — |
|  | Resin (D') | — | 3 |

Resin (D'): Ethylene-propylene block copolymer, $[\eta]_P$=0.94 dl/g, $[\eta]_{EP}$=5.0 dl/g, Content of ethylene-propylene random copolymer portion in ethylene-propylene block copolymer=12.0% by weight, Content of ethylene in ethylene-propylene random copolymer portion=32.0% by weight, MT(190° C.)=0.003N, SR(220° C.)=1.54, and Required time until G(T)/G(0.02) reach 0.01=0.3 sec.

TABLE 8

|  |  | Comparative Example 5 | Comparative Example 6 |
|---|---|---|---|
| MFR (g/10 min.) |  | 35 | 50 |
| FM (kg/cm²) |  | 19900 | 20200 |
| Izod 23° C. (Kg. cm/cm²) | | 52.5 | 38.5 |
| −30° C. |  | 5.2 | 5.3 |
| HDT 18.6 kg/cm² (° C.) | | 68.0 | 68.1 |
| HR |  | 69.4 | 69.0 |
| BP (° C.) |  | −25.5 | −30.0 |
| Appearance |  | Good | Bad |

In Examples 1 to 4, thermoplastic resin compositions are excellent in balance between rigidity (flexural modulus (FM), heat distortion temperature (HDT) and Rock-well hardness (HR)) and impact strength (Izod impact strength (Izod) and brittle temperature (BP)) and maintain the good flowability, and appearance of injection-molded articles thereof is good.

On the contrary, in Comparative Examples 1 to 4 and 6, thermoplastic resin compositions using no resin (D) are bad in appearance, and in Comparative Example 5, the thermoplastic composition in which an excess amount of the resin (D) is added, markedly decreases in flowability (MFR).

According to the present invention, a thermoplastic resin composition having a rigidity and impact strength, and giving a molded article having good appearance when molded, and an injection-molded article thereof can be provided.

What is claimed is:

1. A thermoplastic resin composition comprising the following four (4) distinct components:
    (A) a polypropylene-based resin of 35 to 85% by weight;
    (B) an elastomer of 10 to 35% by weight;
    (C) an inorganic filler of 2 to 30% by weight; and
    (D) a resin that improves the swelling ratio of a polypropylene-based resin composition, of 0.1% by weight or more and less than 5% by weight,
        wherein (1) the melt tension of the resin (D) measured at a temperature of 190° C. and a winding rate of 15.7 m/min. is 0.1 N or more, (2) the swelling ratio of the resin (D) measured at a temperature of 220° C., an L/D ratio of an orifice of 40 and a shear rate of $1.2 \times 10^3$ sec$^{-1}$ is 1.8 or more, and (3) the time required until the ratio (G(t)/G(0.02)) of the relaxation elastic modulus G (t) measured at 210° C. to the relaxation elastic modulus G(0.02) in a time of 0.02 sec. reaches 0.01, of the resin (D) is 10 sec. or more, and
    wherein the sum of the (A), (B), (C) and (D) is 100% by weight.

2. The thermoplastic resin composition according to claim 1, wherein the content of the polypropylene-based resin (A) is from 40 to 80% by weight.

3. The thermoplastic resin composition according to claim 1, wherein the elastomer (B) includes a vinyl aromatic compound-containing rubber and/or an ethylene-α-olefin copolymer rubber, and the content of the elastomer (B) is from 15 to 30% by weight.

4. The thermoplastic resin composition according to claim 1, wherein the inorganic filler (C) is talc and/or magnesium sulfate fiber, and the content of the filler (C) is from 5 to 30% by weight.

5. The thermoplastic resin composition according to claim 1, wherein, in the resin (D), the melt tension measured at a temperature of 190° C. and a winding rate of 15.7 m/min. is 0.15 N or more, the swelling ratio measured at a temperature of 220° C., an L/D ratio of an orifice of 40 and a shearing rate of $1.2 \times 10^3$ sec$^{-1}$ is 2.0 or more, and the time required until the ratio (G(t)/G(0.02)) of the relaxation elastic modulus G(t) measured at 210° C. to the relaxation elastic modulus G(0.02) in a time of 0.02 sec. reaches 0.01 is 15 sec. or more, and the content of the resin (D) is from 0.5 to 4.5% by weight.

6. The thermoplastic resin composition according to claim 1, wherein the resin (D) is an ethylene-propylene block copolymer composed of a propylene homopolymer portion and an ethylene-propylene random copolymer portion having an intrinsic viscosity [η] measured in tetralin at 135° C. of 8 to 15 dl/g and the content of the ethylene-propylene random copolymer portion in the ethylene-propylene block copolymer is from 20 to 40% by weight.

7. An injection-molded article of the thermoplastic resin composition of claim 1.

8. An injection-molded article of the thermoplastic resin composition of claim 2.

9. An injection-molded article of the thermoplastic resin composition of claim 3.

10. An injection-molded article of the thermoplastic resin composition of claim 4.

11. An injection-molded article of the thermoplastic resin composition of claim 5.

12. An injection-molded article of the thermoplastic resin composition of claim 6.

* * * * *